United States Patent
Enayet et al.

(10) Patent No.: US 11,042,547 B2
(45) Date of Patent: Jun. 22, 2021

(54) MOBILE DATA SYNCHRONIZATION FRAMEWORK

(71) Applicant: Nuvolo Technologies Corporation, Jersey City, NJ (US)

(72) Inventors: Nabil Enayet, Jersey City, NJ (US); Jake Ye, Jersey City, NJ (US); Tejas Yadav, West Haven, CT (US); Asim Rizvi, Howell, NJ (US)

(73) Assignee: Nuvolo Technologies Corporation, Paramus, NJ (US)

( * ) Notice: Subject to any disclaimer, the term of this patent is extended or adjusted under 35 U.S.C. 154(b) by 171 days.

(21) Appl. No.: 16/566,303

(22) Filed: Sep. 10, 2019

(65) Prior Publication Data

US 2020/0081888 A1    Mar. 12, 2020

Related U.S. Application Data

(60) Provisional application No. 62/729,387, filed on Sep. 10, 2018.

(51) Int. Cl.
*G06F 16/2455* (2019.01)
*G06F 16/178* (2019.01)

(52) U.S. Cl.
CPC ........ *G06F 16/2455* (2019.01); *G06F 16/178* (2019.01)

(58) Field of Classification Search
CPC .... G06F 16/2455; G06F 16/178; G06F 16/27; H04L 67/42; H04L 67/1002
USPC ........................................................ 707/769
See application file for complete search history.

(56) References Cited

U.S. PATENT DOCUMENTS

| | | | |
|---|---|---|---|
| 7,032,003 B1* | 4/2006 | Shi | H04W 99/00 707/999.01 |
| 8,964,619 B2* | 2/2015 | Navda | H04W 52/0229 370/311 |
| 9,336,291 B2* | 5/2016 | Ireland | G06F 16/27 |
| 9,348,853 B2* | 5/2016 | Garratt | G06F 16/219 |
| 9,866,508 B2* | 1/2018 | Daher | H04L 51/16 |
| 9,953,036 B2* | 4/2018 | Mackenzie | G06F 16/1734 |
| 10,037,339 B1* | 7/2018 | Kleinpeter | G06F 16/156 |
| 10,055,474 B1* | 8/2018 | Wei | H04L 63/08 |
| 10,691,719 B2* | 6/2020 | Kleinpeter | G06F 16/27 |
| 10,936,622 B2* | 3/2021 | Koorapati | G06F 16/178 |

(Continued)

*Primary Examiner* — Hanh B Thai
(74) *Attorney, Agent, or Firm* — Fish & Richardson P.C.; Frank L. Gerratana

(57) ABSTRACT

Methods, systems, apparatus, including computer programs encoded on computer storage media, for fast download of a portion of an enterprise database. In one aspect, the method includes actions of receiving an enterprise database access request, determining a portion of the enterprise database that is accessible to a user that originated the access request, and determining that the received request is a first occurrence of a request for access. Responsive to the first request for access, the operations may also include (i) retrieving each record of the portion of the enterprise database for storage in a synchronization queue, (ii) receiving a download request based on a determination that a first record of the portion of the enterprise database has been placed in the synchronization queue, and (iii) providing the first record to a user device while the server continues to transfer other records of the enterprise database to the synchronization queue.

20 Claims, 3 Drawing Sheets

(56) References Cited

U.S. PATENT DOCUMENTS

| | | | | |
|---|---|---|---|---|
| 2005/0037787 A1* | 2/2005 | Bachner | ............ | H04L 67/1095 455/502 |
| 2005/0044530 A1* | 2/2005 | Novik | ............ | H04L 69/329 717/122 |
| 2005/0086384 A1* | 4/2005 | Ernst | ............ | H04L 67/1095 709/248 |
| 2005/0289264 A1* | 12/2005 | Illowsky | ............ | G06F 9/542 710/104 |
| 2006/0112398 A1* | 5/2006 | Mukkamala | ............ | G06F 9/54 719/316 |
| 2007/0067354 A1* | 3/2007 | Mullender | ............ | G06F 16/27 |
| 2007/0073720 A1* | 3/2007 | Clarke | ............ | H04L 51/22 |
| 2007/0088791 A1* | 4/2007 | Clarke | ............ | H04L 51/00 709/206 |
| 2008/0144601 A1* | 6/2008 | Nurminen | ............ | H04L 69/14 370/350 |
| 2009/0282125 A1* | 11/2009 | Jeide | ............ | H04L 67/1095 709/217 |
| 2012/0066411 A1* | 3/2012 | Jeide | ............ | H04L 67/1095 709/248 |
| 2013/0124458 A1* | 5/2013 | Barreto | ............ | G06F 15/16 707/608 |
| 2013/0124638 A1* | 5/2013 | Barreto | ............ | G06F 15/16 709/205 |
| 2014/0013008 A1* | 1/2014 | Lazarus | ............ | H04L 67/1095 709/248 |
| 2014/0136499 A1* | 5/2014 | Garratt | ............ | G06F 16/178 707/695 |
| 2014/0188798 A1* | 7/2014 | Mackenzie | ............ | G06F 16/182 707/625 |
| 2014/0195485 A1* | 7/2014 | Dorman | ............ | G06F 16/178 707/624 |
| 2014/0379648 A1* | 12/2014 | Chiu | ............ | G06F 16/178 707/624 |
| 2015/0026123 A1* | 1/2015 | Krishnan | ............ | G06F 16/178 707/610 |
| 2015/0032692 A1* | 1/2015 | Litzenberger | ............ | G06F 16/178 707/620 |
| 2015/0088817 A1* | 3/2015 | Dwan | ............ | G06F 3/04883 707/610 |
| 2015/0263909 A1* | 9/2015 | Okubo | ............ | H04L 43/10 709/224 |
| 2015/0278323 A1* | 10/2015 | Melahn | ............ | G06F 16/178 707/610 |
| 2015/0358406 A1* | 12/2015 | Scheer | ............ | G06F 11/30 709/248 |
| 2016/0294916 A1* | 10/2016 | Daher | ............ | H04L 51/08 |
| 2016/0373527 A1* | 12/2016 | Illowsky | ............ | G06F 21/6218 |
| 2017/0003870 A1* | 1/2017 | Dwan | ............ | G06F 3/017 |
| 2017/0060702 A1* | 3/2017 | Dave | ............ | G06F 11/1441 |
| 2017/0109370 A1* | 4/2017 | Newhouse | ............ | H04L 67/1097 |
| 2018/0046644 A1* | 2/2018 | Smith | ............ | G06F 16/178 |
| 2019/0205289 A1* | 7/2019 | Kleinpeter | ............ | H04L 9/3213 |
| 2019/0205413 A1* | 7/2019 | Chung | ............ | G06F 16/1748 |
| 2019/0205548 A1* | 7/2019 | Lee | ............ | G06F 21/10 |
| 2019/0207940 A1* | 7/2019 | Kleinpeter | ............ | G06F 11/1469 |
| 2019/0303897 A1* | 10/2019 | Golberg | ............ | G06F 16/27 |
| 2020/0021650 A1* | 1/2020 | Barreto | ............ | G06F 9/5011 |

* cited by examiner

MOBILE DATA SYNCHRONIZATION FRAMEWORK

BACKGROUND

Enterprise databases include large data warehouse storing volumes of information on order of multiple gigabytes, terabytes, petabytes, exabytes, or even larger.

SUMMARY

The technology at issue in this patent application is related to the synchronization of an enterprise data store with a data store maintained on a mobile device. The mobile device is capable of initiating a fast download of a most recent copy of at least a portion of the enterprise data store by requesting a first portion of the enterprise data store that is stored in synchronization queue while as server continues to identify additional records that may be responsive to the initial download request.

According to one innovated aspect of the present disclosure, a method for fast download of a portion of an enterprise database is disclosed. The method may include actions of receiving, by a server device and from a user device, a request to access at least a portion of an enterprise database, wherein the portion of the enterprise database includes a plurality of records, determining, by the server device based on the request and one or more roles associated with a user of the user device, a portion of the enterprise database that is determined to be accessible to the user of the user device, determining, by the server device, that the received request is a first occurrence of a request for access to the portion of the enterprise database by the user device, and in response to determining, by the server device, that the received request is the first occurrence of a request for access to the portion of the enterprise database by the user device: (i) initiating, by the server, a retrieval process that is configured to retrieve each record of the plurality of records for storage in a synchronization queue that are (a) responsive to the user request and (b) determined to be accessible to the user, (ii) receiving a download request from a user device, wherein the download request from the user device is received responsive to a determination by the user device that a first record of the plurality of records has been placed in the synchronization queue by the server, and (iii) providing, by the server and responsive to the received download request, the first record of the plurality of records while the server continues to transfer one or more other records of the plurality of records to the synchronization queue.

Other versions include corresponding systems, apparatus, and computer programs to perform the actions of methods, encoded on computer storage devices.

These and other versions may optionally include one or more of the following features. For example, in some implementations, the method may further include continuing to provide, by the server, a remainder of the plurality of records that have been transferred to the synchronization queue until each of the plurality of records transferred to the synchronization queue have been provided to the user device.

In some implementations, the method may further include determining, by the server while providing, that one or more records of the plurality of records that have previously been provided to the user device are to be updated using a current copy of the one or more records stored by the enterprise database based on (i) a first time stamp indicating a point in time when the user device synchronized records with the enterprise database and (ii) a respective second time stamp, for each record of the plurality of records, indicating a point in time that each respective record of the plurality of records was last updated.

In some implementations, the method may further include determining, by the server, that one or more records of the plurality of records that have previously been provided to the user device are to be updated using a current copy of the one or more records stored by the enterprise database based on (i) the first time stamp and (ii) the second respective time stamp, for each record of the plurality of records, may include determining, by the server, that one or more of the second respective time stamps occur at a point in time after the first time stamp.

In some implementations, the method may further include obtaining, by the server, each record of the plurality of records having a respective second time stamp that is later in time that the first time stamp, and initiating, by the server, a retrieval process that is configured to retrieve a current copy of each record of the plurality of records having a respective second time stamp that occurs at a point in time after the first time stamp for storage in a synchronization queue.

In some implementations, the method may further include in response to determining, by the server device, that the received request is not a first occurrence of a request for access to the portion of the enterprise database by the user device initiating, by the server, a delta synchronization process that is configured to determine whether one or more of the plurality of records of the portion of the enterprise database are associated with a second respective time stamp indicating a point in time that each respective record of the plurality of records was last updated that occurs at a point in time that is later than a first time stamp indicating a point in time when the user device synchronized records with the enterprise database, obtaining, by the server, each record of the plurality of records having a respective second time stamp that is later in time that the first time stamp, initiating, by the server, a retrieval process that is configured to retrieve a current copy of each record of the plurality of records having a respective second time stamp that occurs at a point in time after the first time stamp for storage in a synchronization queue, receiving a download request from a user device, wherein the download request from the user device is received responsive to a determination by the user device that a first record of the plurality of records has been placed in the synchronization queue by the server, and providing, by the server and responsive to the received download request, the first record of the plurality of records while the server continues to transfer one or more other records of the plurality of records to the synchronization queue.

In some implementations, the received request that is not the first occurrence of a request for access to the portion of the enterprise database by the user device may include a periodic request for an update to the portion of the enterprise database that is stored on the user device.

These and other aspects of the present disclosure provide multiple advantages. For example, the present disclosure reduces the amount of time that is required for a user device to download a portion of an enterprise database. This reduction in the amount of time required for a user device to download a portion of an enterprise database is achieved through the use of a synchronization queue. For example, a server can populate a synchronization queue with records responsive to a user request as the records are identified and while the server continues to identify additional records responsive to the user request. The server can then begin to provide the records stored in the synchronization queue to the user device while the server continues to identify and obtain the remaining records that are responsive to the request. This reduces the time necessary to download a portion of the enterprise database to a user device because the server does not wait until the entire result set is identified and queued before providing the portion of the enterprise database to the user device.

The present disclosure also reduces the time necessary to download a portion of an enterprise database in other ways. For example, in some implementations, the server can immediately load a portion of the enterprise database into a synchronization queue without checking to determine if records in the portion of the enterprise database have been updated since receiving a download request for the portion of the enterprise database. Then, once each relevant portion of the enterprise database is loaded into the synchronization queue, the server can perform processes to identify any records of the enterprise database that need to be updated. The server can provide a current copy of the updated records to the synchronization queue for download by the user device. The user device can update the portion of the enterprise database stored on the user device using the received current copy of the updated records. This immediate download without checking for updates reduces the amount of time necessary for an initial download of a portion of an enterprise database.

DETAILED DESCRIPTION

Aspects of the present disclosure are directed towards a system and method for facilitating a mobile data synchronization framework. The mobile data synchronization framework of the present disclosure reduces the amount of time that is required for a mobile device to download a portion of an enterprise database.

The techniques described in the present disclosure provide multiple operations that reduce the amount of time required to download a portion of an enterprise database to a user device. By way of example, the present disclosure provides a synchronization queue that, when used as described herein, enables a user device to begin immediate download of a portion of an enterprise database requested by a user device.

For example, upon a request for a portion of an enterprise database from a user device, a server can begin identifying and obtaining records from the enterprise database responsive to the user's request. The server begins populating a synchronization queue using the identified and obtained records. Then, the user device can begin downloading the first identified and obtained record as soon as the first obtained and identified record is stored in the synchronization queue and detected by the requesting user device. The server begins providing the records stored in the synchronization queue to the user device while the server continues to identify and obtain the remaining records that are responsive to the request. This reduces the time necessary to download a portion of the enterprise database to a user device because the server does not wait until the entire result set is identified and queued before providing the portion of the enterprise database to the user device.

The present disclosure reduces the time necessary to download a portion of an enterprise database in other ways. For example, in some implementations, the server can immediately load a portion of the enterprise database into a synchronization queue without checking to determine if records in the portion of the enterprise database have been updated since receiving a download request for the portion of the enterprise database. Then, once each relevant portion of the enterprise database is loaded into the synchronization queue, the server can perform processes to identify any records of the enterprise database that need to be updated. The server can provide a current copy of the updated records to the synchronization queue for download by the user device. The user device can update the portion of the enterprise database stored on the user device using the received current copy of the updated records. Accordingly, the present disclosure reduces an initial download time for a portion of an enterprise database by enabling a server to provide portions of the enterprise database stored in the synchronization queue to a mobile device while the enterprise database is determining which records require updating.

Figure 1:
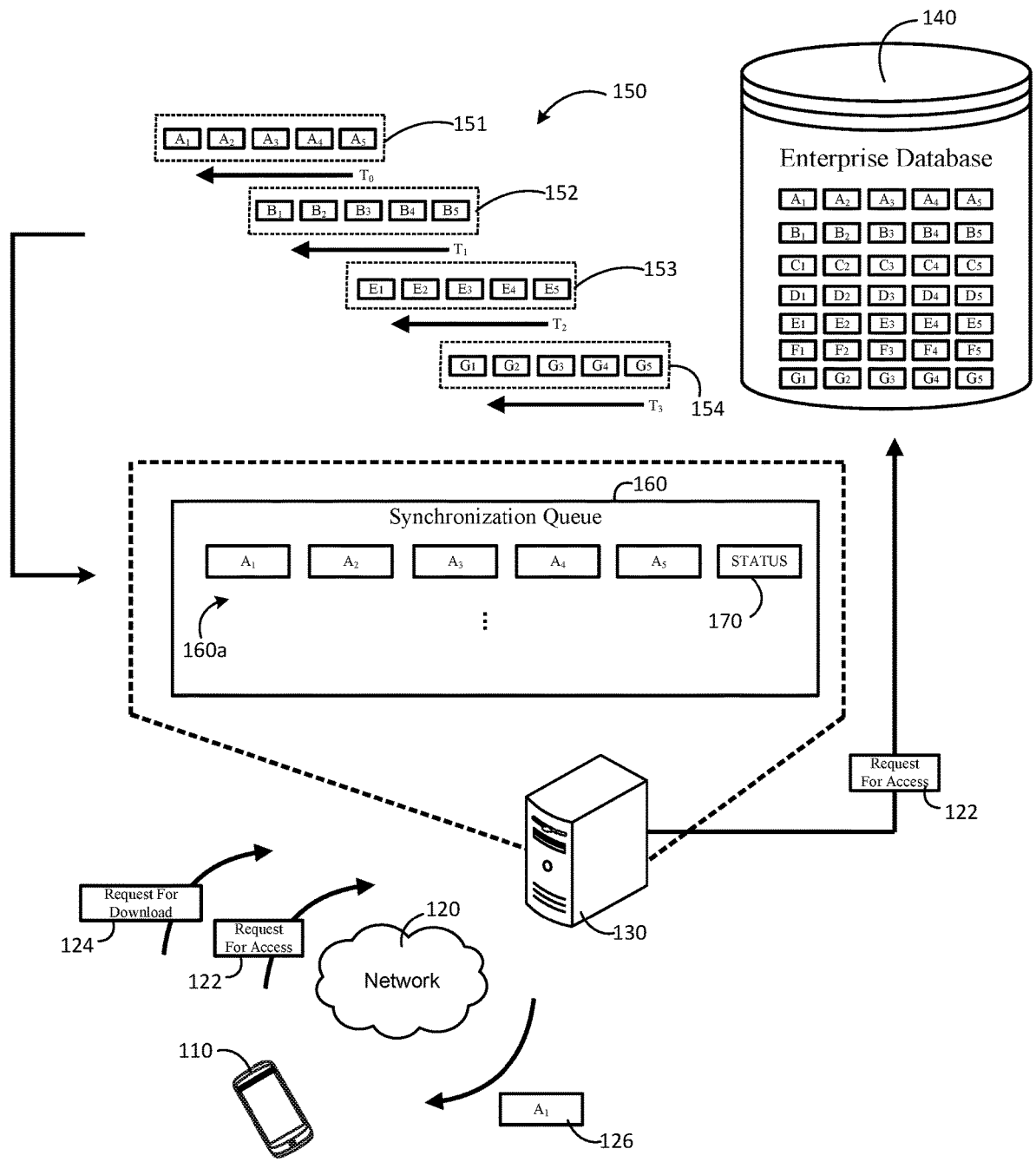
FIG. 1 is a contextual diagram of an example of a system for implementing a mobile data synchronization framework.

FIG. 1 is a contextual diagram of an example of a system 100 for implementing a mobile data synchronization framework. The system 100 may include a user device 110, one or more networks 120, a server 130, an enterprise database 140, and a synchronization queue 160.

The user device 110 may include any device that a user can use to connect to a network 120 and obtain portions of the enterprise database 140. By way of example, the user device 110 may include a smartphone, a tablet computer, a laptop computer, a desktop computer, or the like. A user of the user device can use one or more application on the user device 110 such as a mobile application, a browser, or the like to access a front end application of the enterprise database 140 across the network 120.

The front end application may request authentication credentials to verify the identity of the user and determine a role for the user. The authentication credentials may include a username, password, two-factor identification code, biometric information of the user (e.g., features extracted from a scan of the user's fingerprint, features extracted from a recorded utterance of the user, etc.), or the like. The front end application of the enterprise database 140 can authenticate the user based on the authentication credentials. Authenticating the user may include determining a role for the user. The user's role defines the user's access level. For example, the user's role specifies a set of particular tables of the enterprise database that the user has access to, the particular rows of each table that a user has access to, the particular columns of each table that a user has access to, or a combination thereof. In some implementations, a user role may also delineate the operations that a user can perform on data of the enterprise database 140 that is accessible to the user. For example, the operations that a user can perform may include reading, writing, downloading, printing, sharing, or the like.

With reference to the example of FIG. 1, a request 122 for access to a portion of the enterprise database 140 is received by the server 130 from a user device whose user has been previously authenticated. The server 130 may identify portions of the enterprise database that are accessible by the user of the user device based on the user's role. For example, the server 130 may determine a set of one or more tables accessible to the user's role, a set of rows in one or more tables accessible to the user's role, a set of columns in one or more tables accessible to the user's role, or a combination thereof.

Upon receipt of a request 122 for access to portion of the enterprise database 140, the server 130 can determine whether the request 122 is a first request or a subsequent request. A first request to access a portion of the enterprise database 140 may include, for example, a request to access a portion of the enterprise database 140 before an initial portion of the enterprise database is stored on the user device 110. A subsequent request may include a request for access to a portion of the enterprise database 140 after an initial portion of the enterprise database has been stored on the user device 110. Accordingly, a subsequent request may include, for example, a request for a delta update to one or more records of the portion of the enterprise database 140 that have been downloaded to the user device 110. In some implementations, a subsequent request such as a delta update request may be periodically executed based on user devices settings. For example, a user of the user device 110 may instruct the user device 110 to periodically execute a subsequent delta update request every minute, every 5 minutes, every 15 minutes, every hour, every day, every week, or the like.

In response to determining that the request is a first request, the server 130 may initiate a fast download of a portion of the enterprise database 140 that is responsive to the user's request and accessible to the user's role. Alternatively, in response to determining that the request is a subsequent request, the server 130 may initiate a delta synchronization operation.

When the server determines that the request 122 is a first request, the server 130 may initiate execution 132 of the received request 122 for access against the enterprise database 140 to identify one or more portions of the enterprise database 140 that is responsive to the user request and accessible to the user's role. In some implementations, the server 130 may generate one or more queries based on the request 122 for access. Execution of the one or more queries against the enterprise database 140 may result in a result set 150 that identifies, for example, of a plurality of database records from one or more tables of the enterprise database 140 responsive to the request for access 122. For example, execution of the one or more queries may identify a first record set 151 generated based on a table A that includes records $A_1, A_2, A_3, A_4, A_5$, a second record set 152 generated based on a table B that includes records $B_1, B_2, B_3, B_4, B_5$, a third record set 153 generated based on a table E that includes records $E_1, E_2, E_3, E_4, E_5$, and a fourth record set 154 generated based on a table G that includes records $G_1, G_2, G_3, G_4, G_5$.

The server 130 may identify each of the identified records sets 151, 152, 153, 154 at different respective times such as Time $T_0$, Time $T_1$, Time $T_2$, and Time $T_3$. That is, the first record set 151 may be retrieved at a first time $T_0$ that is before the Times $T_1, T_2, T_3$, the second record set 152 may be identified at a second time $T_1$ that is after $T_0$ but before $T_2, T_3$, the third record set 153 may be identified at a third time $T_2$ that is after times $T_0$ and $T_1$ but before $T_3$, and the fourth record set 154 may be identified a fourth time $T_3$ that is after $T_0, T_1,$ and $T_2$.

Using conventional methods, the server 130 would not provide the record sets 151, 152, 153, 154 to the user device 110 until a download package was constructed that included the entire result set 150. However, this is inefficient and results in delays to the user (or user device 110) in receiving access to portions of the enterprise database 140. Moreover, as the server 130 waits to accrue the entire record set 150, changings are occurring to the obtained records in the backend database, making the records out of sync by the time the entire record sets reach the user device 110. A time required to generate the entire record set 150 would be at least Tsum=$T_0+T_1+T_2, +T_3$. Additional time on top of Tsum would then be required as the server gathers updates to the respective record sets as the result set is being generated. We can refer to this as update time UT. Then, once the result set is tallied, the entire record set 150 would need to be downloaded. This may take an additional download time of DTsum=$DT_0+DT_1+DT_2, +DT_3$. Accordingly, time for the providing a portion of an enterprise database to a user device would be at least Total Time=Tsum+UT+DTsum.

In contrast, the present disclosure provides for a fast download for a portion of the enterprise database that is faster than the conventional methods. The present disclosure uses the synchronization queue 160 to achieve these efficiency gains. For example, the server 130 can begin storing each respective record set 151, 152, 153, 154 in the synchronization queue 160 as the record set is obtained. This allows one or more of the time periods discussed above overlap.

An example illustrates the performance enhancements achieved via parallel execution of these overlapping operations. For example, the user device 110 may detect than an item is placed in the synchronization queue and begin downloading the cached record set 160a. It takes a time $DT_0$ to download the cached record set 160a. However, this download operation of record set 160a occurs while one or more of the records sets 152, 153, 154 are being obtained and placed into the synchronization queue 160. Thus, the time period required to download the record set 160a, which corresponds to record set 151, $DT_0$ overlapps with one or more of the time periods $T_1, T_2, T_3$ required to identify and obtain one or more portions of the enterprise database 150 for placement in the synchronization queue 160. Accordingly, the present disclosure can achieve significantly faster downloads of one or more portions of an enterprise database 140 when these time gains are achieved across tens of records, hundreds of records, thousands of records, millions of records, or even more.

The user device 110 can be configured to detect that an entry 160a has been stored in the synchronization queue 160 in a variety of different ways. For example, the user device can be notified that an entry 160a has been stored in the synchronization queue 160. At this point at $T_0$, the user device 110 can transmit a download request to the server 130 to request download of the records stored in the synchronization queue 160. The user device 110 may begin downloading the cached record set 160a, which corresponds to record set 151, from the synchronization queue while the server 130 continues to identify and obtain record set 152, 153, 154 at $T_1, T_2,$ and/or $T_3$. For example, the user device 110 can begin downloading a record 126 of the cached record set 160a. This process may continue until each of the record sets are provided to the user device 110. For example, the record set 152 may be stored in the synchronization queue and then downloaded by the user device 110 while one or more additional record sets are being identified as being part of the result set 150. Over time, there may be multiple items cached in the synchronization queue 160 awaiting download by the user device 110 while yet other records are identified and obtained from the enterprise data base 140.

The server 130 may manage one or more time stamps to track an enterprise portion update time for each user device 110 that has downloaded a portion of the enterprise database 140. In some implementations, the enterprise portion update time stamp may indicate a last time a copy of a portion of the enterprise database 140 was stored on the user device 110, a last time a copy of a portion of the enterprise database stored on a user device 110 was updated, or the like. This may include, for example, a time when an initial download of a portion of the enterprise database 140 was initialized, a time when the initial download of the enterprise database 140 was completed, or the last time the copy of the portion of the enterprise database 140 was updated via a delta synchronization process. Alternatively, the server may maintain a time stamp for each record set that was downloaded by a user device 110. In either instance, the managed time stamps may be compared to a corresponding time stamp on the master copy of enterprise database 140 that is maintained by the server 130 or one or more other cloud-based servers.

The server 130 can check for record updates after identifying each portion of the enterprise database 140 that is responsive to the request 122 and accessible to the user's role. For example, the server 130 can determine, based on a record update timestamp whether any records responsive to the request 122 have been updated. In some implementations, the server 130 may compare the current time stamp for each record identified as responsive to the request 122 with a time stamp indicating a last time a copy of the enterprise database 140 stored on the user device 110 was updated. In such instances, if a current time stamp for a record identified as responsive to the request 122 is identified as being later than a time stamp indicating a last update time of the user device 110, then the server 130 can obtain the record and add the record to the synchronization queue 160. The user device 110 can download the updated record from the synchronization queue 160.

In some implementations, the server 130 may determine that a received request 124 for download to the enterprise database 140 is a subsequent request for access to the enterprise database 140. A subsequent request 124 for download may include, for example, a request for an update to one or more portions of the copy of the enterprise database 140 that is stored on the user device 110. The subsequent request 124 for download may be a periodic request for update from the user device 110. Alternatively, a subsequent request 124 for download may include, for example, a request that is submitted manually by a user that requests an update to refresh the contents of the portion of the enterprise database 140 that is stored on the user device 110. Such subsequent requests can trigger initiation of a delta synchronization process that is configured to synchronize the contents of the portion of the enterprise database stored on the user device 110 with the corresponding portions of the enterprise database 140 maintained by the server 130 or one or more other cloud-based servers.

Performance of the delta synchronization processes begins with the server 130 determining whether any differences exist between the portion of the enterprise database downloaded by the user device 110 and the corresponding portions of the enterprise database 140 maintained by the server 130 or one or more other cloud-based servers. In some implementations, the server 130 may perform this determination based on a comparison of particular time stamps. For example, the server 130 may compare (i) one or more enterprise portion update time stamps for a user device 110 and (ii) a current time stamp, for each record of the corresponding portion of the enterprise database 140 recorded maintained by the server 130 or other cloud-based server, indicating a last time the record was updated. In such instances, if a current time stamp for a corresponding record maintained by the server 130, or other cloud-based server, is determined to be later than the enterprise portion update time stamp for the user device 110, then the server 130 can obtain the record and add the record to the synchronization queue 160. This process can be iteratively performed to identify and is checked user device 110 can download the updated record from the synchronization queue 160. In some implementations, a user device 110 may be associated with multiple enterprise portion update time stamps if each downloaded record set includes its own enterprise portion update time stamp.

In some implementations. The server 130 may generate a status flag 170 for each cached entry 160a in the synchronization queue 160. The status flag 170 may provide an indication as to whether the cached entry 160a has been fully downloaded to the user device 110. Once the cached entry 160a has been downloaded to the user device 110, the status flag 170 may be toggled to indicated that the cached entry 160a has been downloaded. The server 130 may periodically scan the synchronization queue 160 to identify each cached entry having a status flag 170 indicating that the corresponding cache entry has been downloaded. In some implementations, the server 130 can delete each cached record from the synchronization queue 160 that is identified as having a status flag 170 indicating that the cached record has been downloaded.

Figure 2:
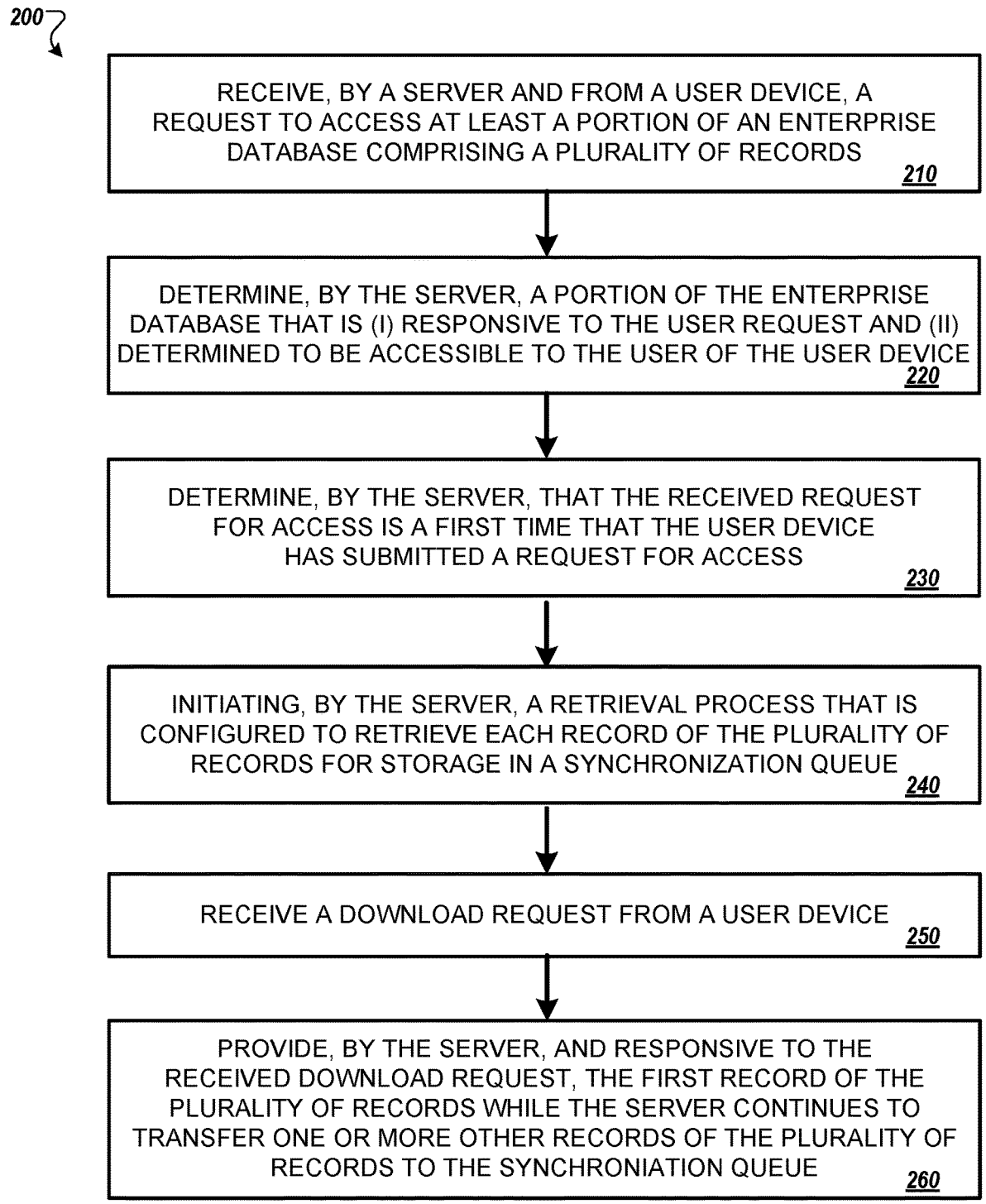
FIG. 2 is a flowchart of a process for implementing a mobile data synchronization framework.

FIG. 2 is a flowchart of a process 200 for implementing a mobile data synchronization framework. The process 200 may include receiving, by a server device and from a user device, a request to access at least a portion of an enterprise database, wherein the portion of the enterprise database includes a plurality of records (210). The sever device can determine, based on the request and one or more roles associated with a user of the user device, a portion of the enterprise database that is determined to be accessible to the user of the user device (220). The server can determine that the received request is a first occurrence of a request for access to the portion of the enterprise database by the user device. Then, the server can determine that the received request is the first occurrence of a request for access to the portion of the enterprise database by the user device (230).

In response to determining, by the server device, that the received request is the first occurrence of a request for access to the portion of the enterprise database by the user device, (i) initiating, by the server, a retrieval process that is configured to retrieve each record of the plurality of records for storage in a synchronization queue that are (i) responsive to the user request and (ii) determined to be accessible to the user (240), (iii) receiving a download request from a user device, wherein the download request from the user device is received responsive to a determination by the user device that a first record of the plurality of records has been placed in the synchronization queue by the server (250), and (iv) providing, by the server and responsive to the received download request, the first record of the plurality of records while the server continues to transfer one or more other records of the plurality of records to the synchronization queue (260).

Figure 3:
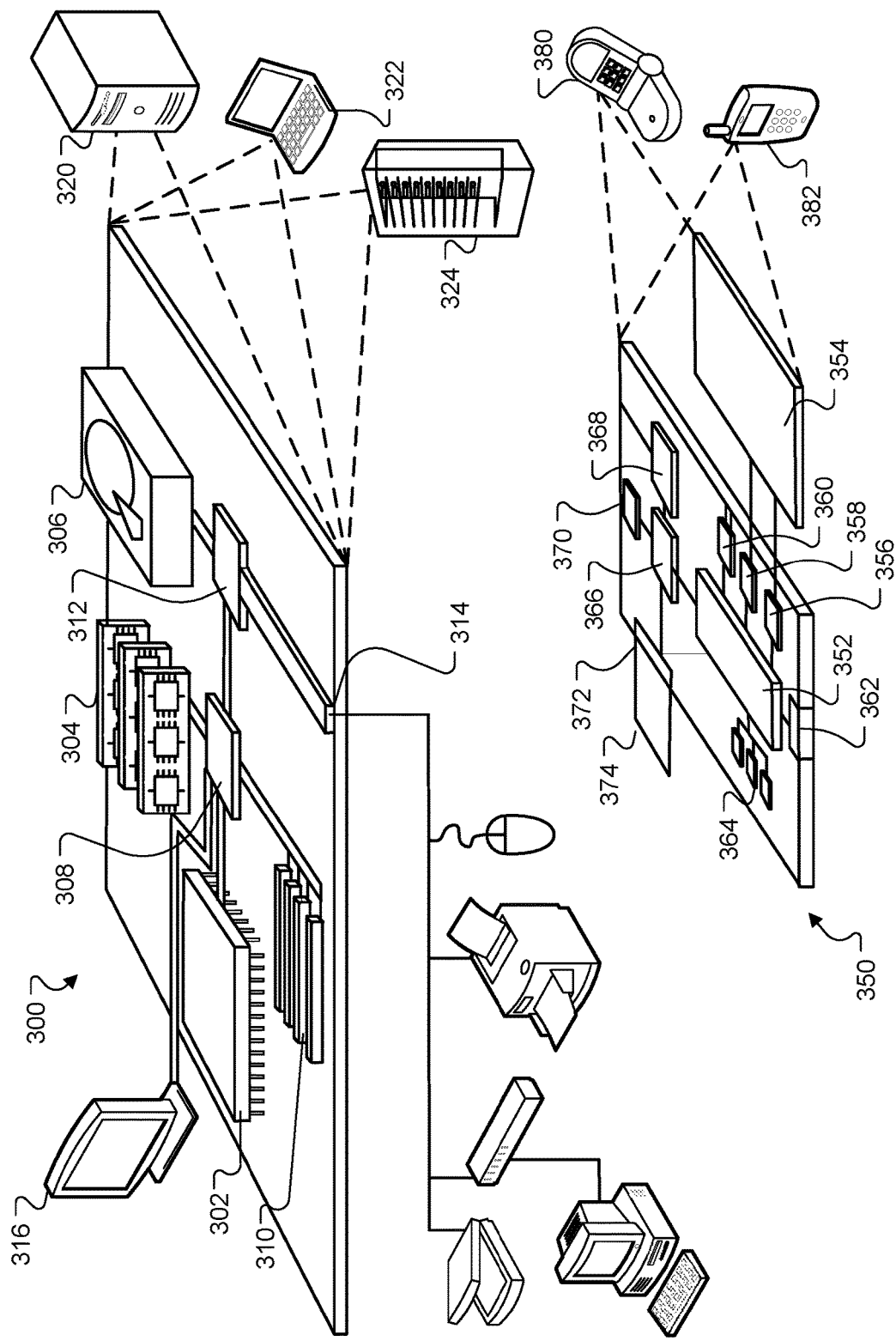
FIG. 3 is a block diagram of a system for implementing a mobile data synchronization framework.

Alternatively, in response to determining by the server device, that the received request is not a first occurrence of a request for access to the portion of the enterprise database by the user device, the server can initiate performance of a delta synchronization process that is configured to determine whether one or more of the plurality of records of the portion of the enterprise database are associated with a second respective time stamp indicating a point in time that each respective record of the plurality of records was last updated that occurs at a point in time that is later than a first time stamp indicating a point in time when the user device synchronized records with the enterprise database, obtaining, by the server, each record of the plurality of records having a respective second time stamp that is later in time that the first time stamp. The server can initiate a retrieval process that is configured to retrieve a current copy of each record of the plurality of records having a respective second time stamp that occurs at a point in time after the first time stamp for storage in a synchronization queue. The server can receive a download request from a user device, wherein the download request from the user device is received responsive to a determination by the user device that a first record of the plurality of records has been placed in the synchronization queue by the server. The server can provide the first record of the plurality of records while the server continues to transfer one or more other records of the plurality of records to the synchronization queue FIG. 3 is a block diagram of a system for implementing a mobile data synchronization framework.

Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. For example, the mobile device 110 of FIG. 1 may be an example of a computing device 350. Additionally, computing device 300 or 350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 308, a high-speed interface 308 connecting to memory 304 and high-speed expansion ports 310, and a low speed interface 312 connecting to low speed bus 314 and storage device 308. Each of the components 302, 304, 308, 308, 310, and 312, are interconnected using various busses, and can be mounted on a common motherboard or in other manners as appropriate. The processor 302 can process instructions for execution within the computing device 300, including instructions stored in the memory 304 or on the storage device 308 to display graphical information for a GUI on an external input/output device, such as display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 308 is capable of providing mass storage for the computing device 300. In one implementation, the storage device 308 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 304, the storage device 308, or memory on processor 302.

The high speed controller 308 manages bandwidth-intensive operations for the computing device 300, while the low speed controller 312 manages lower bandwidth intensive operations. Such allocation of functions is exemplary only. In one implementation, the high-speed controller 308 is coupled to memory 304, display 316, e.g., through a graphics processor or accelerator, and to high-speed expansion ports 310, which can accept various expansion cards (not shown). In the implementation, low-speed controller 312 is coupled to storage device 308 and low-speed expansion port 314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

Computing device 350 includes a processor 352, memory 364, and an input/output device such as a display 354, a communication interface 366, and a transceiver 368, among other components. The device 350 can also be provided with a storage device, such as a micro-drive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chipset of chips that include separate and multiple analog and digital processors. Additionally, the processor can be implemented using any of a number of architectures. For example, the processor 310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 350, such as control of user interfaces, applications run by device 350, and wireless communication by device 350.

Processor 352 can communicate with a user through control interface 358 and display interface 356 coupled to a display 354. The display 354 can be, for example, a TFT (Thin-Film-Transistor Liquid Crystal Display) display or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provide in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can include secure information also. Thus, for example, expansion memory 374 can be provide as a security module for device 350, and can be programmed with instructions that permit secure use of device 350. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that can be received, for example, over transceiver 368 or external interface 362.

Device 350 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a Bluetooth, Wi-Fi, or other such transceiver (not shown). In addition, GPS (Global Positioning System) receiver module 370 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, such as through a speaker, e.g., in a handset of device 350. Such sound can include sound from voice telephone calls, can include recorded sound, e.g., voice messages, music files, etc. and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the follow

The invention claimed is:

1. A method comprising:
receiving, by a server device and from a user device, a request to access at least a portion of an enterprise database, wherein the portion of the enterprise database includes a plurality of records;
determining, by the server device based on the request and one or more roles associated with a user of the user device, a portion of the enterprise database that is determined to be accessible to the user of the user device;
determining, by the server device, that the received request is a first occurrence of a request for access to the portion of the enterprise database by the user device; and
in response to determining, by the server device, that the received request is the first occurrence of a request for access to the portion of the enterprise database by the user device:
(i) initiating, by the server, a retrieval process that is configured to retrieve each record of the plurality of records for storage in a synchronization queue that are (a) responsive to the user request and (b) determined to be accessible to the user;
(ii) receiving a download request from a user device, wherein the download request from the user device is received responsive to a determination by the user device that a first record of the plurality of records has been placed in the synchronization queue by the server; and
(iii) providing, by the server and responsive to the received download request, the first record of the plurality of records while the server continues to transfer one or more other records of the plurality of records to the synchronization queue.

2. The method of claim 1, the method further comprising:
continuing to provide, by the server, a remainder of the plurality of records that have been transferred to the synchronization queue until each of the plurality of records transferred to the synchronization queue have been provided to the user device.

3. The method of claim 1, the method further comprising:
determining, by the server while providing, that one or more records of the plurality of records that have previously been provided to the user device are to be updated using a current copy of the one or more records stored by the enterprise database based on (i) a first time stamp indicating a point in time when the user device synchronized records with the enterprise database and (ii) a respective second time stamp, for each record of the plurality of records, indicating a point in time that each respective record of the plurality of records was last updated.

4. The method of claim 3, wherein determining, by the server, that one or more records of the plurality of records that have previously been provided to the user device are to be updated using a current copy of the one or more records stored by the enterprise database based on (i) the first time stamp and (ii) the second respective time stamp, for each record of the plurality of records, comprises:
determining, by the server, that one or more of the second respective time stamps occur at a point in time after the first time stamp.

5. The method of claim 4, the method further comprising:
obtaining, by the server, each record of the plurality of records having a respective second time stamp that is later in time that the first time stamp; and
initiating, by the server, a retrieval process that is configured to retrieve a current copy of each record of the plurality of records having a respective second time stamp that occurs at a point in time after the first time stamp for storage in a synchronization queue.

6. The method of claim 1, the method further comprising:
in response to determining, by the server device, that the received request is not a first occurrence of a request for access to the portion of the enterprise database by the user device:
initiating, by the server, a delta synchronization process that is configured to determine whether one or more of the plurality of records of the portion of the enterprise database are associated with a second respective time stamp indicating a point in time that each respective record of the plurality of records was last updated that occurs at a point in time that is later than a first time stamp indicating a point in time when the user device synchronized records with the enterprise database;
obtaining, by the server, each record of the plurality of records having a respective second time stamp that is later in time that the first time stamp;
initiating, by the server, a retrieval process that is configured to retrieve a current copy of each record of the plurality of records having a respective second time stamp that occurs at a point in time after the first time stamp for storage in a synchronization queue;
receiving a download request from a user device, wherein the download request from the user device is received responsive to a determination by the user device that a first record of the plurality of records has been placed in the synchronization queue by the server; and
providing, by the server and responsive to the received download request, the first record of the plurality of records while the server continues to transfer one or more other records of the plurality of records to the synchronization queue.

7. The method of claim 1, wherein the received request that is not the first occurrence of a request for access to the portion of the enterprise database by the user device comprises a periodic request for an update to the portion of the enterprise database that is stored on the user device.

8. A system comprising:
one or more computers and one or more storage devices storing instructions that are operable, when executed by one or more computers, to cause the one or more computers to perform the operations comprising:
receiving, by a server device and from a user device, a request to access at least a portion of an enterprise database, wherein the portion of the enterprise database includes a plurality of records;
determining, by the server device based on the request and one or more roles associated with a user of the user device, a portion of the enterprise database that is determined to be accessible to the user of the user device;
determining, by the server device, that the received request is a first occurrence of a request for access to the portion of the enterprise database by the user device; and
in response to determining, by the server device, that the received request is the first occurrence of a request for access to the portion of the enterprise database by the user device:
(i) initiating, by the server, a retrieval process that is configured to retrieve each record of the plurality of records for storage in a synchronization queue that are (a) responsive to the user request and (b) determined to be accessible to the user;
(ii) receiving a download request from a user device, wherein the download request from the user device is received responsive to a determination by the user device that a first record of the plurality of records has been placed in the synchronization queue by the server; and
(iii) providing, by the server and responsive to the received download request, the first record of the plurality of records while the server continues to transfer one or more other records of the plurality of records to the synchronization queue.

9. The system of claim 8, the operations further comprising:
continuing to provide, by the server, a remainder of the plurality of records that have been transferred to the synchronization queue until each of the plurality of records transferred to the synchronization queue have been provided to the user device.

10. The system of claim 8, the operations further comprising:
determining, by the server while providing, that one or more records of the plurality of records that have previously been provided to the user device are to be updated using a current copy of the one or more records stored by the enterprise database based on (i) a first time stamp indicating a point in time when the user device synchronized records with the enterprise database and (ii) a respective second time stamp, for each record of the plurality of records, indicating a point in time that each respective record of the plurality of records was last updated.

11. The system of claim 10, wherein determining, by the server, that one or more records of the plurality of records that have previously been provided to the user device are to be updated using a current copy of the one or more records stored by the enterprise database based on (i) the first time stamp and (ii) the second respective time stamp, for each record of the plurality of records, comprises:
determining, by the server, that one or more of the second respective time stamps occur at a point in time after the first time stamp.

12. The system of claim 11, the operations further comprising:
obtaining, by the server, each record of the plurality of records having a respective second time stamp that is later in time that the first time stamp; and
initiating, by the server, a retrieval process that is configured to retrieve a current copy of each record of the plurality of records having a respective second time stamp that occurs at a point in time after the first time stamp for storage in a synchronization queue.

13. The system of claim 8, the operations further comprising:
in response to determining, by the server device, that the received request is not a first occurrence of a request for access to the portion of the enterprise database by the user device:
initiating, by the server, a delta synchronization process that is configured to determine whether one or more of the plurality of records of the portion of the enterprise database are associated with a second respective time stamp indicating a point in time that each respective record of the plurality of records was last updated that occurs at a point in time that is later than a first time stamp indicating a point in time when the user device synchronized records with the enterprise database;
obtaining, by the server, each record of the plurality of records having a respective second time stamp that is later in time that the first time stamp;
initiating, by the server, a retrieval process that is configured to retrieve a current copy of each record of the plurality of records having a respective second time stamp that occurs at a point in time after the first time stamp for storage in a synchronization queue;
receiving a download request from a user device, wherein the download request from the user device is received responsive to a determination by the user device that a first record of the plurality of records has been placed in the synchronization queue by the server; and
providing, by the server and responsive to the received download request, the first record of the plurality of records while the server continues to transfer one or more other records of the plurality of records to the synchronization queue.

14. The system of claim 8, wherein the received request that is not the first occurrence of a request for access to the portion of the enterprise database by the user device comprises a periodic request for an update to the portion of the enterprise database that is stored on the user device.

15. A computer-readable medium encoded with instructions that, when executed by or more computers, cause the one or more computers to perform the operations comprising:
receiving, by a server device and from a user device, a request to access at least a portion of an enterprise database, wherein the portion of the enterprise database includes a plurality of records;
determining, by the server device based on the request and one or more roles associated with a user of the user device, a portion of the enterprise database that is determined to be accessible to the user of the user device;

determining, by the server device, that the received request is a first occurrence of a request for access to the portion of the enterprise database by the user device; and in response to determining, by the server device, that the received request is the first occurrence of a request for access to the portion of the enterprise database by the user device:
  (i) initiating, by the server, a retrieval process that is configured to retrieve each record of the plurality of records for storage in a synchronization queue that are (a) responsive to the user request and (b) determined to be accessible to the user;
  (ii) receiving a download request from a user device, wherein the download request from the user device is received responsive to a determination by the user device that a first record of the plurality of records has been placed in the synchronization queue by the server; and
  (iii) providing, by the server and responsive to the received download request, the first record of the plurality of records while the server continues to transfer one or more other records of the plurality of records to the synchronization queue.

16. The computer-readable medium of claim 15, the operations further comprising:
continuing to provide, by the server, a remainder of the plurality of records that have been transferred to the synchronization queue until each of the plurality of records transferred to the synchronization queue have been provided to the user device.

17. The computer-readable medium of claim 15, the operations further comprising:
determining, by the server while providing, that one or more records of the plurality of records that have previously been provided to the user device are to be updated using a current copy of the one or more records stored by the enterprise database based on (i) a first time stamp indicating a point in time when the user device synchronized records with the enterprise database and (ii) a respective second time stamp, for each record of the plurality of records, indicating a point in time that each respective record of the plurality of records was last updated.

18. The computer-readable medium of claim 17, wherein determining, by the server, that one or more records of the plurality of records that have previously been provided to the user device are to be updated using a current copy of the one or more records stored by the enterprise database based on (i) the first time stamp and (ii) the second respective time stamp, for each record of the plurality of records, comprises:
determining, by the server, that one or more of the second respective time stamps occur at a point in time after the first time stamp.

19. The computer-readable medium of claim 18, the operations further comprising:
obtaining, by the server, each record of the plurality of records having a respective second time stamp that is later in time that the first time stamp; and
initiating, by the server, a retrieval process that is configured to retrieve a current copy of each record of the plurality of records having a respective second time stamp that occurs at a point in time after the first time stamp for storage in a synchronization queue.

20. The computer-readable medium of claim 15, the operations further comprising:
in response to determining, by the server device, that the received request is not a first occurrence of a request for access to the portion of the enterprise database by the user device:
  initiating, by the server, a delta synchronization process that is configured to determine whether one or more of the plurality of records of the portion of the enterprise database are associated with a second respective time stamp indicating a point in time that each respective record of the plurality of records was last updated that occurs at a point in time that is later than a first time stamp indicating a point in time when the user device synchronized records with the enterprise database;
  obtaining, by the server, each record of the plurality of records having a respective second time stamp that is later in time that the first time stamp;
  initiating, by the server, a retrieval process that is configured to retrieve a current copy of each record of the plurality of records having a respective second time stamp that occurs at a point in time after the first time stamp for storage in a synchronization queue;
  receiving a download request from a user device, wherein the download request from the user device is received responsive to a determination by the user device that a first record of the plurality of records has been placed in the synchronization queue by the server; and
  providing, by the server and responsive to the received download request, the first record of the plurality of records while the server continues to transfer one or more other records of the plurality of records to the synchronization queue.

* * * * *

UNITED STATES PATENT AND TRADEMARK OFFICE
CERTIFICATE OF CORRECTION

| | | |
|---|---|---|
| PATENT NO. | : 11,042,547 B2 | Page 1 of 1 |
| APPLICATION NO. | : 16/566303 | |
| DATED | : June 22, 2021 | |
| INVENTOR(S) | : Nabil Enayet et al. | |

It is certified that error appears in the above-identified patent and that said Letters Patent is hereby corrected as shown below:

On the Title Page

Item (72) Inventor Name:
Delete "Jake Ye" and insert --Tao Ye Jersey City New Jersey (U.S)--

Signed and Sealed this
Eleventh Day of July, 2023

*Katherine Kelly Vidal*

Katherine Kelly Vidal
*Director of the United States Patent and Trademark Office*